United States Patent [19]

Guagliumi et al.

[11] 3,951,466
[45] Apr. 20, 1976

[54] ANTI-SKID BRAKING SYSTEMS FOR VEHICLES

[75] Inventors: Renato Guagliumi; Giuseppe Cuzzucoli, both of Turin, Italy

[73] Assignee: Fiat Societa per Azioni, Turin, Italy

[22] Filed: July 10, 1974

[21] Appl. No.: 487,120

[30] Foreign Application Priority Data

July 26, 1973   Italy ................................ 69247/73

[52] U.S. Cl. ...................... 303/21 CG; 188/181 A; 303/20; 303/21 P
[51] Int. Cl.² ............................................ B60T 8/8
[58] Field of Search ............ 188/181 A; 303/20, 21; 307/10 R; 317/5; 324/162; 340/53, 62, 262

[56]   References Cited
UNITED STATES PATENTS

| | | | |
|---|---|---|---|
| 3,398,995 | 8/1968 | Martin | 303/21 BE |
| 3,523,712 | 8/1970 | Leiber | 303/21 CG |
| 3,524,685 | 8/1970 | Harned et al. | 303/21 BE |
| 3,604,761 | 9/1971 | Okamoto et al. | 303/21 CG |
| 3,604,762 | 9/1971 | Ando et al. | 188/181 A X |
| 3,622,977 | 11/1971 | Wakamatsu et al. | 340/62 |
| 3,820,857 | 6/1974 | Schnaibel et al. | 303/21 BE |

*Primary Examiner*—Trygve M. Blix
*Assistant Examiner*—Stephen G. Kunin
*Attorney, Agent, or Firm*—Sughrue, Rothwell, Mion, Zinn & Macpeak

[57]   ABSTRACT

An antiskid braking system of the type which includes a threshold circuit which at a first threshold level releases the brakes and at a second threshold level reapplies the brakes according to the deceleration of the vehicle. A correction signal circuit varies the first threshold level in dependence upon or more dynamic parameters of the vehicle such as the wheel speed and/or vehicle deceleration to optimise the anti-skid braking.

3 Claims, 4 Drawing Figures

ANTI-SKID BRAKING SYSTEMS FOR VEHICLES

BACKGROUND OF THE INVENTION

This invention relates to an improvement in anti-skid braking systems for vehicles and in particular to systems in which the braking of the vehicle is effected in a series of cycles of brake application and brake release wherein the start of each brake release and brake application is controlled by a threshold circuit.

The threshold circuit acts upon the braking elements of the wheels through an actuator device which normally consists of a solenoid valve which, when energised, interrupts the existing braking action and which when de-energised re-applies the brakes. Intervention of the threshold circuit is dependent upon a signal caused by the deceleration or acceleration of the wheels and applied to the threshold circuit by a speed differentiator.

The threshold circuit operates within a first threshold level called the "debraking threshold" and a second threshold level called the "re-braking or braking pickup threshold". When, during braking of the vehicle (brake pedal depressed), the deceleration signal provided by the differentiator reaches the first threshold level the threshold circuit trips and causes brake release (debraking) of the wheels by energisation of the solenoid valve. Upon debraking there is an increase in the speed of the vehicle wheels and as soon as the signal from the differentiator reaches the second threshold level, the threshold circuit causes the resumption of braking by de-energisation of the solenoid valve.

In known antiskid braking systems the debraking threshold is set at a constant level and this can bring about a loss of braking efficiency due, for example, to variations in the speed of the vehicle or in the road surface conditions. A low threshold level will be suitable for slow vehicles or for any vehicle at low speed, whilst it is not suitable for fast vehicles. In fact, for fast vehicles, a low braking threshold could result in the intervention of the system (de-braking) due to very small variations of the wheel speed with a consequent series of cycles in which de-braking occurred too quickly. Thus pseudo-skidding conditions could arise to the detriment of braking efficiency, that is, with unduly long stopping distances.

On the other hand a high debraking threshold is suitable for fast vehicles whilst it is not suitable for low speeds or for slow vehicles. In fact, in the latter case a high threshold may give rise to cycles with a tendency for wheel slip, with a consequent danger of wheel locking, resulting in short braking distances, but also in loss of maneuverability of the vehicle.

Moreover, a constant level threshold does not give the best results in the face of road surface variations. If the threshold is high and the vehicle brakes upon ground having a low coefficient of friction, release of the brakes may take place when the wheels have reached high slippage, with a consequent danger of wheel locking. If, on the other hand, the threshold is low, and the vehicle brakes upon ground having a low coefficient of friction, brake release may occur too quickly, before the wheels reach the point of slippage, and the overall braking effect is reduced.

SUMMARY OF THE INVENTION

According to the present invention there is provided an antiskid braking system for a vehicle of the type including a threshold circuit having a first threshold level to control debraking and a second threshold level to control rebraking, and including a correction circuit for applying to the threshold circuit a correction signal representative of at least one of the dynamic parameters of the vehicle to vary the first threshold level.

If the parameter concerned is the instantaneous speed of the wheels then a signal proportional to the speed of the wheels is utilised to correct the debraking threshold, being applied to a control input of the threshold circuit, through the correction circuit, in this case responsive to the wheel speed. In this way, optimum braking conditions may be achieved for both slow and fast vehicles and for the same vehicle at both high and low speeds.

If on the other hand the parameter in question is the type of road surface, then a correction signal is applied which is proportional to the vehicle's deceleration. This signal is passed to the threshold circuit via the correction circuit. In this way the threshold level may be adapted so that it is suitable for the particular road surface thus allowing effective braking under all road surface conditions.

It will be apparent that signals representing both speed and deceleration may be applied simultaneously to the threshold circuit so as to vary its braking threshold.

BRIEF DESCRIPTION OF THE DRAWINGS

The invention will be described, by way of non-limiting example, with reference to the accompanying drawings, in which.

DETAILED DESCRIPTION OF THE ILLUSTRATED EMBODIMENTS

Figure 1:
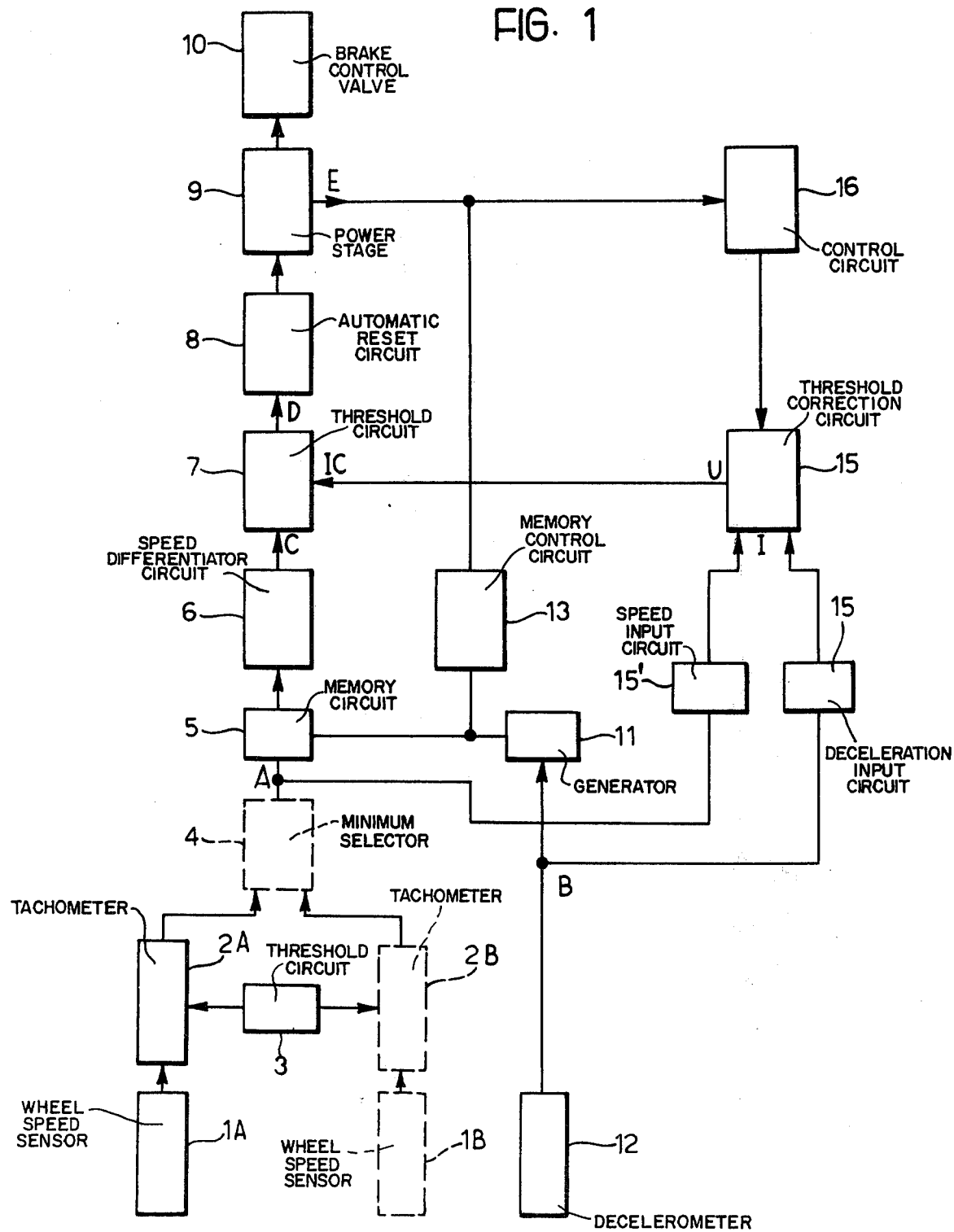
FIG. 1 is a block schematic diagram of an antiskid brake system according to one embodiment of the invention.

Referring to FIG. 1 the illustrated embodiment of the antiskid braking system includes at least one speed sensor 1A consisting generally of a pick-up which supplies alternating signals of frequency proportional to the speed of the wheel being controlled. A tachometer 2A is driven by the sensor 1A and supplies a voltage signal proportional to the speed of the wheel being controlled. The tachometer 2A is connected to one input of a threshold circuit 3 which determines the minimum intervention speed. A minimum selector 4 is also provided when two wheels on the same axle are being controlled, that is, when an additional sensor 1B and an associated tachometer 2B are used, these optional components being shown in dashed lines. A speed memory circuit 5 is adapted to memorise the wheel speed signal during the debraking stage. The speed signal comes directly from the tachometer 2A when only one wheel is being controlled, or through the minimum selector 4 when two wheels are being controlled. Connected to the memory circuit 5 is a speed differentiator circuit 6 which provides a signal representative of the wheel acceleration or deceleration. This latter signal is applied as one input to a threshold circuit 7. An automatic reset circuit 8 is connected to the threshold circuit 7 to re-establish the braking action if the correct command from the circuit 7 is not received in time. A power stage 9 connected to the circuit 8 causes a control valve 10, normally comprising a solenoid valve, to control the brake pressure applied to the or each wheel brake actuator (not shown).

Also provided is a generator 11 which supplies the memory circuit 5 with an electrical current signal proportional to the deceleration of the vehicle. A decelerometer 12 supplies the generator 11 with a voltage signal proportional to the deceleration of the vehicle.

A control circuit 13 for the memory circuit 5, controlled by the power stage 9, is connected to the output of the generator 11.

In operation, alternating signals supplied by the pickups 1A and 1B of the two wheels of the axle being controlled are processed in the respective tachometers 2A and 2B which provide at their outputs continuous voltages proportional to the speed of the wheels. If the wheel speeds are below a predetermined minimum value, the circuit 3 applies a minimum value to the outputs of the respective tachometers 2A and 2B. The minimum selector circuit 4 selects from the tachometer outputs the wheel speed signal representing the lower of the two wheel speeds.

The speed differentiator circuit 6 supplies a signal proportional to the deceleration of the slower wheel. When this deceleration signal reaches the threshold value defined by the circuit 7, energisation of the solenoid valve 10 is effected by the power stage 9. Energisation of the solenoid valve 10 induces de-braking of the two wheels being controlled.

The energisation signal of the solenoid valve 10 is taken from the power stage 9 and also acts, through the control circuit 13, upon the memory circuit 5 which stores the lower of the two wheel speeds. A signal proportional to the deceleration of the vehicle, recorded by the decelerometer 12, is provided by the generator 11 in the form of a current which slowly discharges the memory 5, simulating the velocity decrease of the decelerating vehicle.

When the lower speed of the two wheels has increased, as a result of the de-braking, and reaches the detected speed of the vehicle, then the chain of circuits constituted by the blocks 6, 7, 8, 9 causes de-energisation of the solenoid valve 10, reapplying the brakes, assuming that the driver has kept the brake pedal depressed.

At the same time the de-energisation command of the solenoid valve 10 acts upon the memory control circuit 13 so as to erase the speed signal stored in the memory circuit 5 and to cause the speed signal of the slower wheel to be re-applied to the speed differentiator 6. The anti-skid brake intervention cycle is then complete.

Subsequent braking cycles are repeated under analogous conditions and with decreasing vehicle speeds, until the vehicle stops.

Figure 2:
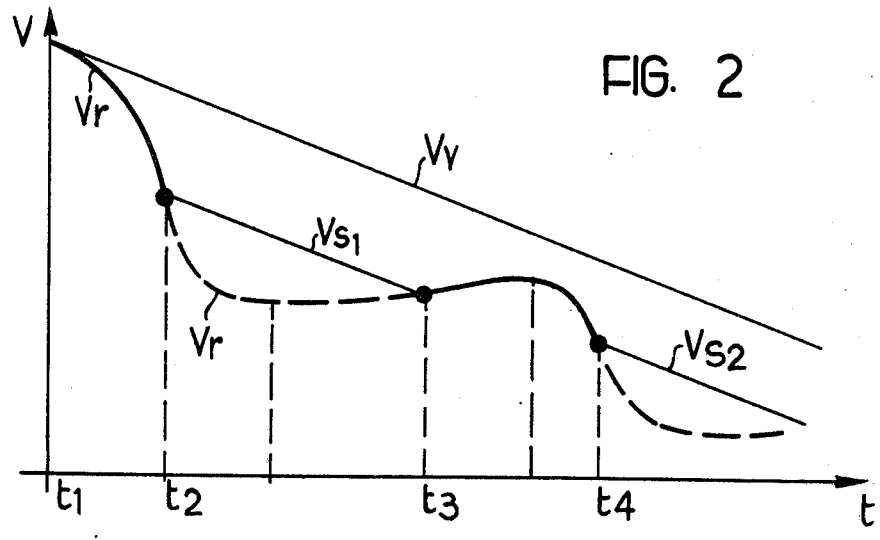
FIG. 2 is a graph which shows the variation with time of the speed of the vehicle and of the vehicle wheels during antiskid braking.

The variation of the speed Vv of the vehicle and of the wheel Vr during two successive braking cycles is shown in FIG. 2. The moments that braking starts are shown at $t_1$ and $t_3$ and the moments of brake release (de-braking) are shown at $t_2$ and $t_4$. The lines Vs1, Vs2, represent the detected speed of the vehicle, less a constant and their points of intersection with the reascending dashed lines of the wheel speed Vr define precisely the moments when braking is reimposed.

Figure 3:
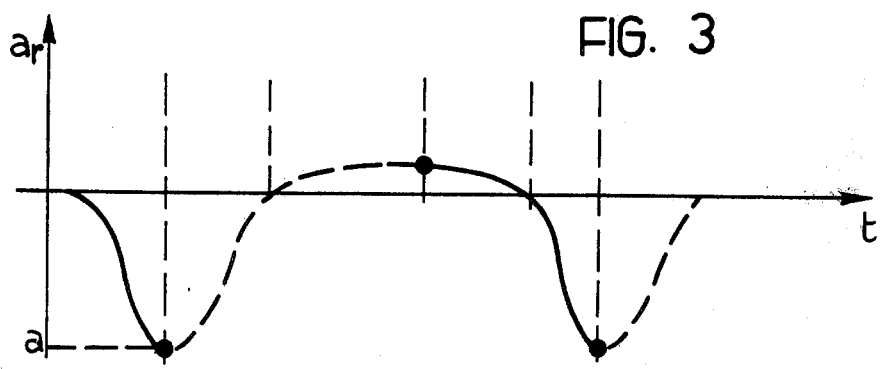
FIG. 3 is a graph showing the deceleration of the wheels during antiskid braking.

The variation of acceleration $a_r$ of the wheel is shown in FIG. 3, where $a$ indicates the threshold debraking value defined by the circuit 7.

According to this invention, in order to improve the operational performance of the antiskid system under all driving conditions and on all road surfaces, the debraking threshold $a$ is made to vary with the speed of the wheels. This is achieved by taking off the voltage signal at the output A of the minimum selector 4 (see FIG. 1) and applying it as a correction signal to the speed signal at the control input IC of the threshold circuit 7, via a debraking threshold correction circuit 15. Thus, circuit 15 provides a correction signal dependent on at least one of the dynamic parameters of the vehicle.

According to another aspect of the invention, the debraking threshold is made to vary with the vehicle's deceleration, in which case the decelometric signal is taken at the output B of the decelerometer 12 (see FIG. 1) and applied to the threshold circuit 7 via the correction circuit 15.

Obviously the debraking threshold can be modified to take into account both parameters. In this case the corrections applied are those shown in FIG. 1 where 15' and 15'' are two input circuits of the speed and acceleration signals and I is the input to the correction circuit 15.

If the threshold circuit 7 is of the type in which the two thresholds are interconnected or interdependent whereby variation in one is followed by variation in the other, whilst it is desired to keep the rebraking threshold constant, there is then provided a control circuit for the rebraking threshold, shown by the block 16. This circuit cooperates with the correction circuit 15 in the braking stage, so that the debraking threshold depends upon the speed and/or deceleration, while the control circuit 16 does not cooperate with the circuit 15 during the rebraking stage, so that the braking or rebraking threshold does not depend upon the speed and/or deceleration.

In order to put this into effect the control circuit 16 is connected to a control output E of the power stage 9 by which the circuit 16 is controlled to afford cooperation with the correction circuit 15 only when the de-energisation signal is sent to the solenoid valve 10.

Figure 4:
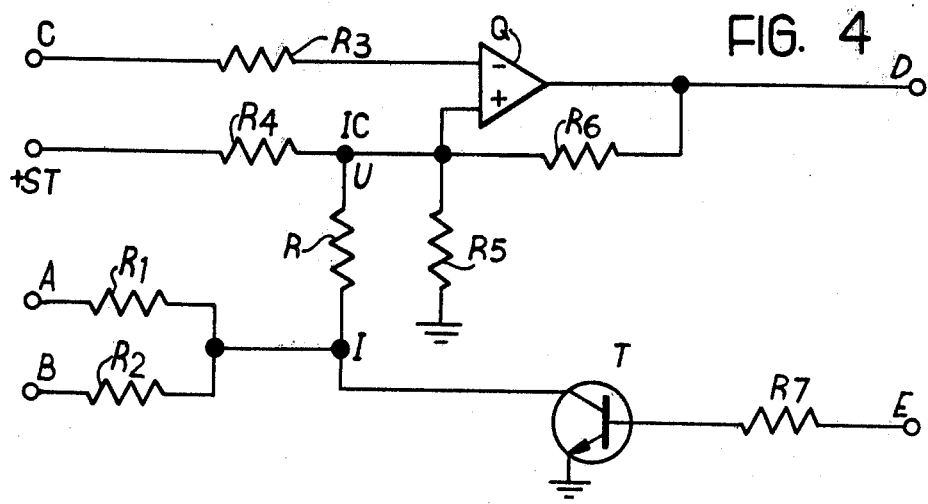
FIG. 4 shows a simple embodiment of the correction circuit for control of the debraking threshold.

FIG. 4 shows a simple embodiment of the circuit for effecting a correction of the de-braking threshold with reference to the speed of the wheels and to the acceleration of the vehicle.

The correction circuit 15 and the input circuits 15' and 15'' in FIG. 1 are constituted by simple resistances R, R1, R2 respectively and the control circuit 16 is constituted by a transistor T. A signal proportional to the deceleration of the vehicle registered at point B is applied to the input end I resistance R via R2.

The output end U of resistance R is connected to the controlling input IC of the threshold circuit which consists of a hysteresis comparator having an amplifier Q which is trigger connected. With this threshold circuit the output U is connected to the positive input (+) of the amplifier Q, whilst the output C of the differentiator 6 is connected to the negative input (−) of the amplifier Q through a resistance $R_3$. In the comparator + ST indicates a stabilized voltage, and R4, R5, R6 the resistances which define the thresholds of intervention. As can be seen, the correction circuit 15 is a resistive circuit the function of which is to combine the speed and acceleration signals supplied by A and B and to apply them to the point IC, where they are summed with the stabilized voltage +ST.

Naturally, signals proportional to other parameters can also be applied to the input I of this circuit. Such a signal is, for example, the load of the vehicle. On the other hand if one should wish to apply to the input I a signal proportional to only the speed or acceleration of the vehicle then it suffices simply to connect the point B or A to earth, according to which signal is to be excluded.

The control circuit 16 is constituted by an electronic switch comprising the transistor T, the collector of which is connected to the input end I of the resistance R and the base of which is connected to the control output E of the power stage 9 through a resistance R7. The transistor T acts as a trip circuit; that is, all or nothing (on or off).

During the debraking stage, the power stage 9 supplies an energisation signal to the solenoid valve 10 and a control signal to the transistor T, which saturates, earthing the input end I of resistance R, so that any signal present at A and B will not affect the voltage at the point IC. During this stage, therefore the resistance R will not receive consent from the input end I and the rebraking threshold is the constant one defined by +ST and the resistances R4, R5, R6.

During braking, on the other hand, the power stage 9 sends an interdiction signal to the transistor T, so that the signals provided by A and B are summed in R and combine at point IC with the signal of the stabilized voltage + ST so as to cause variation of the debraking threshold.

The correction circuit 15 can of course be embodied in a different way from that illustrated without nevertheless departing from the scope of the invention.

As will be understood the function of the electronic switch T is to control the voltage at the output end of resistances R1, R2, that is, the voltage at point I, so as to provide as necessary a voltage at the point IC. It will be apparent that if the braking threshold is to be varied then the transistor T and the resistance R can be omitted, and the point I may be connected directly to the point IC.

We claim:

1. An antiskid braking system for a vehicle including a source of pressure, brake actuator means associated with at least one wheel of the vehicle, control valve means interconnecting the pressure source and the brake actuator means and controlling the release and reapplication of the brake actuator means, a threshold circuit controlling said control valve means in response to the deceleration of the vehicle wheels, said threshold circuit initiating release of the brake actuator means at a first threshold level and initiating a reapplication of the brake actuator means at a second threshold level and wherein the improvements comprise: (a) a first circuit means for applying a voltage signal proportional to the instantaneous wheel speed to alter the first threshold level whereby the release of the brake actuator means varies according to said dynamic parameter, said first circuit means comprising two resistive networks having a common point, the first resistive network having at least one input terminal to which at least one signal corresponding to at least one said dynamic parameter is applied and the second resistive network being connected to an input of the threshold circuit, and (b) a correcting signal control circuit having means to annul the signal from said first circuit means for applying the correcting signal during brake release to keep the second threshold level constant while varying the first threshold level, the correcting signal control circuit controlling the common point of the two resistive networks of said first circuit means and comprising a transistor T, the collector of shich is connected to the input of a resistive circuit and the base of which is connected to the output of the control of the power stage by means of a resistance operable by a signal from the valve means upon brake release.

2. An antiskid braking system for a vehicle including a source of pressure, brake actuator means associated with at least one wheel of the vehicle, control valve means interconnecting the pressure source and the brake actuator means and controlling the release and re-application of the brake actuator means, a threshold circuit controlling said control valve means in response to the deceleration of the vehicle wheels, said threshold circuit initiating release of the brake actuator means at a first threshold level and initiating a reapplication of the brake actuator means at a second threshold level, said first and said second threshold levels being interdependent, and wherein the improvements comprise: (a) a first circuit means for applying a voltage signal proportional to the deceleration of the vehicle to alter the first threshold level, said first circuit means comprising two resistive networks having a common point, the first resistive network having at least one input terminal to which at least one signal corresponding to at least one said dynamic parameter is applied and the second resistive network being connected to an input of the threshold circuit; and (b) a correcting signal control circuit having means to annul the signal from said first circuit means during brake release to keep the second threshold level constant while varying the first threshold level, the correcting signal control circuit controlling the common point of the two resistive networks of said first circuit means and comprising a transistor T, the collector of which is connected to the input of a resistive circuit and the base of which is connected to the output of the control of the power stage by means of a resistance operable by a signal from the valve means upon brake release.

3. An antiskid braking system for a vehicle including a source of pressure, brake actuator means associated with at least one wheel of the vehicle, control valve means interconnecting the pressure source and the brake actuator means and controlling the release and re-application of the brake actuator means, a threshold circuit controlling said control valve means in response to the deceleration of the vehicle wheels, said threshold circuit initiating a release of the brake actuator means at a first threshold level and initiating a reapplication of the brake actuator means at a second threshold level said first and second threshold levels being interdependent and wherein the improvements comprise: (a) a first circuit means for applying a voltage signal proportional to the instantaneous wheel speed and to the deceleration of the vehicle to alter the first threshold level whereby the application of brake release varies according to said dynamic parameter, said first circuit means comprising two resistive networks having a common point, the first resistive network having at least one input terminal to which at least one signal corresponding to at least one said dynamic parameter is applied and the second resistive network being connected to an input of the threshold circuit; and (b) a correcting signal control circuit having means to annul the signal from said circuit means for applying the correcting signal during brake release to keep the second threshold level constant while varying the first threshold level, the correcting signal control circuit controlling the common point of the two resistive networks of said first circuit means and comprising a transistor T, the collector of which is connected to the input of a resistive circuit and the base of which is connected to the output of the control of the power stage by means of a resistive operable by a signal from the valve means upon brake release.

* * * * *

UNITED STATES PATENT OFFICE
CERTIFICATE OF CORRECTION

Patent No. 3,915,466　　　　　　　　　　Dated October 28, 1975

Inventor(s) HIDEKI MATSUDA

It is certified that error appears in the above-identified patent and that said Letters Patent are hereby corrected as shown below:

On cover sheet,

Assignee: "Saisha" should read -- Kaisha --.

Signed and Sealed this sixth Day of April 1976

[SEAL]

Attest:

RUTH C. MASON
*Attesting Officer*

C. MARSHALL DANN
*Commissioner of Patents and Trademarks*